United States Patent
Pille-Wolf et al.

(10) Patent No.: US 10,717,853 B2
(45) Date of Patent: Jul. 21, 2020

(54) RUBBER COMPOSITIONS CONTAINING IMPROVED TREAD ENHANCEMENT ADDITIVES AND USE THEREOF

(71) Applicant: Kraton Chemical, LLC, Jacksonville, FL (US)

(72) Inventors: Wolfgang Pille-Wolf, Tervuren (NL); Jérémie Guillaume Pichereau, Almere (NL); Hannes Hendrik Peter van Erp, Almere (NL); Jeffrey R Warmkessel, Savannah, GA (US); Blaisdell Benedict Willis, Savannah, GA (US)

(73) Assignee: Kraton Chemical, LLC, Jacksonville, FL (US)

( * ) Notice: Subject to any disclaimer, the term of this patent is extended or adjusted under 35 U.S.C. 154(b) by 29 days.

(21) Appl. No.: 15/784,440

(22) Filed: Oct. 16, 2017

(65) Prior Publication Data

US 2018/0105681 A1    Apr. 19, 2018

Related U.S. Application Data (60) Provisional application No. 62/408,210, filed on Oct. 14, 2016.

(51) Int. Cl.
| | | |
|---|---|---|
| *C08L 9/06* | (2006.01) | |
| *C08G 61/02* | (2006.01) | |
| *C08G 67/00* | (2006.01) | |

(52) U.S. Cl.
CPC ............... *C08L 9/06* (2013.01); *C08G 61/02* (2013.01); *C08G 67/00* (2013.01); *C08L 2205/02* (2013.01); *C08L 2205/03* (2013.01)

(58) Field of Classification Search
CPC .................................. C08G 61/02; C08L 9/06
See application file for complete search history.

(56) References Cited

U.S. PATENT DOCUMENTS

| 5,457,175 A | 10/1995 | Scharrer et al. |
|---|---|---|
| 6,160,083 A | 12/2000 | Thompson et al. |
| (Continued) | | |

FOREIGN PATENT DOCUMENTS

| EP | 2270088 B1 | 5/2013 |
|---|---|---|
| EP | 1913075 B1 | 12/2014 |
| (Continued) | | |

OTHER PUBLICATIONS

Reusch, Electrophilic Substitution of the Phenol Aromatic Ring. Virtual Textbook of Organic Chemistry. Jan. 13, 2014.

*Primary Examiner* — Vickey Nerangis
(74) *Attorney, Agent, or Firm* — Ramesh Krishnamurti (57) ABSTRACT

The disclosure relates to a composition for use in a number of applications including tires. The composition comprises a blend of a rubber component, reinforcing particulate fillers, and based on 100 parts by weight (phr) of the rubber component; from about 5 phr to about 70 phr of a terpene phenol resin having a softening point temperature in the range of from about 100° C. to about 170° C. and having a hydroxyl value in the range from about 5 to about 30. In one embodiment, the terpene phenol resin has a number average molecular weight of from about 700 Da to about 790 Da, a weight average molecular weight of from about 930 Da to about 1090 Da, and a polydispersity index of from about 1.25 to about 1.45.

16 Claims, 2 Drawing Sheets

(56) References Cited

U.S. PATENT DOCUMENTS

| | | | |
|---|---|---|---|
| 8,362,118 B2 * | 1/2013 | Mihara | B60C 1/0016 524/492 |
| 8,859,650 B2 * | 10/2014 | Katou | B60C 1/0016 524/62 |
| 2010/0113703 A1 | 5/2010 | Houjo et al. | |
| 2011/0184084 A1 | 7/2011 | Katou | |
| 2011/0213049 A1 * | 9/2011 | Takizawa | B60C 1/0016 523/156 |
| 2013/0203890 A1 | 8/2013 | Lopitaux et al. | |

FOREIGN PATENT DOCUMENTS

| | | |
|---|---|---|
| EP | 2940072 A1 | 11/2015 |
| JP | 4559692 | 10/2010 |
| JP | 5076365 | 11/2012 |
| JP | 5076366 | 11/2012 |

* cited by examiner

RUBBER COMPOSITIONS CONTAINING IMPROVED TREAD ENHANCEMENT ADDITIVES AND USE THEREOF

RELATED APPLICATIONS

This application claims priority from U.S. Provisional Application No. 62/408,210, with filing date of Oct. 14, 2016, the entire disclosures of which is incorporated herein by reference for all purposes.

TECHNICAL FIELD

The present disclosure relates to terpene phenol resins and rubber compositions comprising same. More particularly the present disclosure relates to improved terpene phenol resins for use the production of improved performance tires.

BACKGROUND

Tires, as a vehicle's sole link with the roadway, play a key role in automotive safety and also have an indirect influence on fuel consumption, as well as many other characteristics. Rubber tires, such as those used in transportation, are conventionally prepared with a rubber tread. Such rubber tread is often composed of a specified rubber composition. Some desired attributes of high performance tires include superior wet grip (wet traction) and superior rolling resistance, e.g., the force resisting the motion when a tire rolls on the surface. While dry grip is usually maintained by many rubber compositions, wet grip is not. Rubber compositions having good wet grip improve wet skid resistance however the tradeoff is the loss of rolling resistance which contributes to decreased fuel economy.

There exists an ongoing need for improved rubber compositions able to provide properties suitable for the fabrication of high performance tires.

SUMMARY

In one aspect, a rubber composition comprising terpene phenol resins is disclosed. The terpene phenol resin comprises (i) a phenol such as ortho- and para-C— as well as O-alkylated phenols derived from the reaction with terpenes and (ii) a terpene selected from the group consisting of α-pinene, β-pinene, D-limonene, dipentene (racemic limonene), δ-3 carene, β-phellandrene and pyrolysates of α-pinene, β-pinene, δ-3 carene, turpentine and combinations thereof wherein the resin has (1) a ratio of terpene to phenol ranging from about 95:5 to about 60:40; (2) a softening point temperature between about 100° C. and about 170° C., alternatively between about 130° C. and about 160° C., or alternatively between about 145° C. and about 155° C. and (3) a hydroxyl number between about 5 to about 30, alternatively between about 6 to about 20, or alternatively between about 7 to about 15. In one embodiment, the terpene phenol resin has a glass transition temperature in the range of from about 95° C. to about 105° C., alternatively from about 97° C. to about 103° C., or alternatively from about 98° C. to about 102. In one embodiment, the terpene phenol resin has a number average molecular weight of from about 700 Da to about 790 Da, alternatively from about 730 Da to about 770 Da, or alternatively from about 740 Da to about 760 Da. In one embodiment, the terpene phenol resin has a weight average molecular weight of from about 930 Da to about 1090 Da, alternatively from about 960 Da to about 1060 Da, or alternatively from about 990 Da to about 1030 Da. In yet another embodiment, the terpene phenol resin has PDI of from about 1.25 to about 1.45, alternatively from about 1.3 to about 1.4, or alternatively from about 1.32 to about 1.38.

In another aspect, the disclosure relates to a composition comprising (a) rubber and (b) a terpene phenol resin comprising (i) a phenol and (ii) α-pinene, wherein the resin has a softening point between about 100° C. and about 170° C., alternatively between about 130° C. and about 160° C., or alternatively between about 145° C. and about 155° C. and a hydroxyl number between about 5 to about 30, alternatively between about 6 to about 20, or alternatively between about 7 to about 15. In one embodiment, the rubber composition has a tan δ at 0° C. ranging from about 0.62 to about 0.72, alternatively from about 0.65 to about 0.70, or alternatively from about 0.66 to about 0.68. In yet another embodiment, the composition has a tan δ at 60° C. ranging from about 0.14 to about 0.20, alternatively from about 0.15 to about 0.19, or alternatively from about 0.16 to about 0.18. In one embodiment, the composition has a rebound at 23° C. ranging from about 24% to about 32%, alternatively from about 26% to about 30%, or alternatively from about 27% to about 29%. In yet another embodiment, the composition has a rebound at 60° C. ranging from about 40% to about 65%, alternatively from about 50% to about 60%, or alternatively from about 54% to about 58%.

DETAILED DESCRIPTION

The following terms will be used throughout the specification and will have the following meanings unless otherwise indicated:

"phr" means parts per hundred parts of rubber, and is a measure common in the art wherein components of a composition are measured relative to the total of all of the elastomer (rubber) components. The total phr or parts for all rubber components, whether one, two, three, or more different rubber components when present in a given recipe, is always defined as 100 phr. As used herein, the amounts of all other non-rubber components are expressed in phr, as against 100 parts of rubber.

"Elastomer" may be used interchangeably with the term "rubber." Elastomer refers to any polymer or combination of polymers consistent with the ASTM D1566 definition.

"Polymer" and "interpolymer" are used broadly herein, and interchangeably mean higher oligomers having a number average molecular weight (Mn) equal to or greater than 100, as well as compounds that meet the molecular weight requirements for polymers according to classic ASTM definitions, prepared by the polymerization or oligomerization of at least two different monomers, including copolymers, terpolymers, tetrapolymers, etc.

$T_{sp}$ (softening point) may be determined by ASTM E28, or a ring and ball, or ring and cup softening point tests, or ASTM D 6090 Cup and Ball using DP70 of Mettler-Toledo.

Tg (glass-liquid transition or glass transition) may be determined according to ASTM D 6604 (2013) using a Differential Scanning Calorimeter SC Q2000 from TA Instruments.

Hydroxyl value (OH—) is a measure of the content of free hydroxyl groups in a chemical substance, usually expressed in units of the mass of potassium hydroxide (KOH) in milligrams equivalent to the hydroxyl content of one gram of the chemical substance. Hydroxyl value may be determined according to ASTM E222.

Disclosed herein are compositions comprising rubber and at least one terpene phenol resin, which may also be referred to as a tread enhancement additive. Herein, tread enhancement additives refer to chemical compounds used in formulating tire tread compounds in order to improve its viscoelastic properties, specifically the trade-off between wet grip and rolling resistance.

Resin Component.

The resin component herein includes substituted or unsubstituted units derived from cyclopentadiene homopolymer or copolymer resins (referred to as CPD), dicyclopentadiene homopolymer or copolymer resins (referred to as DCPD or (D)CPD), terpene homopolymer or copolymer resins, rosin derived resins, rosin/rosin esters, pinene homopolymer or copolymer resins, C5fraction homopolymer or copolymer resins, C9 fraction homopolymer or copolymer resins, alpha-methylstyrene homopolymer or copolymer resins, and combinations thereof. In one embodiment, the resin may further include units derived from (D)CPD/vinylaromatic copolymer resins, (D)CPD/terpene copolymer resins, terpene/phenol copolymer resins, (D)CPD/pinene copolymer resins, pinene/phenol copolymer resins, (D)CPD/C5 fraction copolymer resins, (D)CPD/C9 fraction copolymer resins, terpene/vinylaromatic copolymer resins, terpene/phenol copolymer resins, pinene/vinylaromatic copolymer resins, pinene/phenol resins, C5 fraction/vinylaromatic copolymer resins, and combinations thereof. The phrase "units derived from dicyclopentadiene" includes units derived from substituted DCPD such as methyl DCPD or dimethyl DCPD.

In one embodiment, the resin is used as an extender for the rubber composition. The resins can be used alone and can be used in combination of two or more thereof, in an amount ranging from about 5 to 80 phr; alternatively from 10 to 50 phr; or alternatively from 15 to 30 phr. In one embodiment, the rubber composition includes any of 5, 10, 15, 20, 25, 30, 35, 40, 45, 50, 55, 60, 65, 70, 75, or in any range from to or between any two of the foregoing numbers.

In one embodiment, the resin is functionalized with a hydrosilylation agent, e.g., with a compound (cyclic or non-cyclic) having a Si—H bond that catalytically reacts with the backbone of resin. The functionalization can be single or dual.

In one embodiment, the compositions comprise a terpene phenol resin. Unless otherwise indicated, as used herein the term "phenol" includes substituted and unsubstituted phenols and derivatives thereof. Accordingly, phenols suitable for use in the present disclosure include without limitation ortho- and para-C- as well as O-alkylated phenols derived from the reaction with terpenes.

Terpenes herein refer to molecules which are derived from units of isoprene. The basic molecular formula of terpenes are multiples of (C5H8)n where n is the number of linked isoprene units with a minimum of n equal to 2. Examples of terpenes suitable for use in the presently disclosed terpene phenol resin include without limitation α-pinene, β-pinene, D-limonene, dipentene (racemic limonene), δ-3 carene, β-phellandrene and pyrolysates of α-pinene, β-pinene, δ-3 carene, δ-2 carene, turpentine, and combinations thereof. In an embodiment the terpene comprises α-pinene, β-pinene, D-limonene, dipentene (racemic limonene), δ-3 carene. Alternatively, the terpene is α-pinene. The terpene and phenol may be present in a ratio of terpene to phenol ranging from about 95:5 to about 60:40.

The terpene phenol resin may be prepared by any suitable methodology. For example, a phenol may first be dissolved in an organic solvent such as polar or aromatic solvents that are inert with respect to the reaction (e.g., haloaromatic or haloalkanes). The phenol and solvent may be charged to a reaction vessel in any order or substantially simultaneously with stirring. Once the phenol and solvent are charged and the phenol is dissolved in the solvent, the solution may be distilled azeotropically to remove any water from the solution. After distillation, the solution can be cooled to room temperature under an inert gas atmosphere, such as nitrogen or argon, and a catalyst charged to the reaction vessel.

Examples of phenolic compounds include phenol, alkylphenol, bisphenol A, cresol, xylenol and the like. Examples of the alkylphenol resin include alkylphenol-aldehyde condensation resins obtained by reacting alkylphenol with aldehyde such as formaldehyde, acetaldehyde or furfural using an acid or an alkali catalyst; alkylphenol-alkyne condensation resins obtained by reacting alkylphenol with alkyne such as acetylene; and modified alkylphenol resins. Examples of vinyl aromatic compounds include but are not limited to styrene and alkyl substituted styrene such as α-methyl styrene ("AMS").

The catalyst may be selected from a wide variety of Lewis acid catalysts such as aluminum halides, titanium halides, boron halides, protic acids, clays and modified clays, and alkyl and phenyl derivatives of boron, aluminum, and titanium halides. In one embodiment, the catalyst comprises AlCl3, AlBr3, Me3SiCl or combinations thereof. In another embodiment, the catalyst system additionally comprises an aluminum halide such as AlCl3 in combination with the Lewis acid catalyst (e.g., AlBr3 or Me3SiCl). Upon completion of the catalyst addition, the terpene component is gradually charged. When the reaction is substantially complete, as indicated by the absence of an exotherm or temperature rise in the reaction mass, the reaction product mixture may be quenched by stirring in a basic solution, (e.g., sodium carbonate solution) to deactivate the catalyst. After quenching the catalyst, stirring is discontinued and the reaction product is heated to promote separation of the product into an aqueous phase and an organic phase. The aqueous phase and organic phase may be separated or the organic phase may be recovered from the reaction product by extraction or drying techniques. The reaction product is a terpene phenol resin.

In an embodiment, the terpene phenol resin is obtained by polymerizing phenol and at least a terpene selected from the group consisting of α-pinene, β-pinene, dipentene, and limonene, at a molar ratio of terpene to phenol in the range from about 1:1 to about 4:1.

In another embodiment, the terpene phenol resin is obtained by adding a phenol to at least a terpene selected from the group consisting of α-pinene, β-pinene, dipentene, and limonene, in the presence of a Lewis acid catalyst, at a molar ratio of terpene to phenol in the range from about 1:1 to about 4:1, wherein the Lewis acid catalyst is selected from ether complexes of boron trifluoride and organic acid complexes of boron trifluoride.

In one embodiment wherein the terpene phenol resin is further functionalized, a mixture of the resin, a functionalizing agent and a catalyst, e.g., a platinum (Pt) based material having 0.1 to 10 wt % Pt-containing complexes in a suitable solvent, is introduced into a reaction zone for a functionalized product. The functionalized resin can be further hydrogenated after completion or during reaction conditions, in the presence of any known catalysts commonly used for hydrogenating petroleum resins. In yet another embodiment after functionalization/hydrogenation, the functionalized resin can be further treated with the addition of silica in an about of 5 to 50 phr, such that the ratio of wt. % of the functionalized resin to silica for pre-treating is 1:2 to 1:5.

Examples of functionalizing agents include but are not limited to hydrosilylation agents, e.g., compounds (cyclic or non-cyclic) having a Si—H bond that can catalytically react with the polymer backbone to yield a functionalized resin. Other examples include organomercaptosilanes having a bulky group and/or a polyether group, alkoxy silanes such as aminoalkyltrialkoxysilanes, methacryloxyalkyltrialkoxysilanes, polysulfanalkyltrialkoxysilanes and mercaptoalkyltrialkoxysilanes.

Properties of the Terpene Phenol Resin:

In an embodiment, the terpene phenol resin is characterized by softening temperature or Tsp in the range of from about 100° C. to about 170° C., or 130° C. to about 160° C., or 145° C. to about 155° C.

In an embodiment, the terpene phenol resin of the present disclosure is characterized by a low hydroxyl value. In an embodiment, the terpene phenol resins are characterized by a hydroxyl number ranging from about 5 mg KOH/g to about 30 mg KOH/g, or from 6 mg KOH/g to about 20 mg KOH/g, or from 7 mg KOH/g to about 15 mg KOH/g. The hydroxyl value may be determined in accordance with ASTM E222.

In an embodiment, the terpene phenol resin is characterized by a Tg from about 95° C. to about 105° C., or from 97° C. to about 103° C., or from 98° C. to 102° C.

In an embodiment, the terpene phenol resin is characterized by a number average molecular weight (Mn) of from about 700 Daltons (Da) to about 790 Da, or from about 730 Da to about 770 Da, or from about 740 Da to about 760 Da, and a weight average molecular weight (Mw) of from about 930 Da to about 1090 Da, alternatively from about 960 Da to about 1060 Da, or alternatively from about 990 Da to about 1030 Da. The number-average molecular weight Mn is given by equation 1:

$$Mn = \Sigma N x M x \quad (1)$$

where Nx is the mole-fraction (or the number-fraction) of molecules whose weight is Mx The weight-average molecular weight Mw is given by equation 2:

$$Mw = \Sigma w x M x \quad (2)$$

where wx is the weight-fraction of molecules whose weight is Mx. One method to calculate the $M_w$ is determined using gel permeation/size exclusion chromatography (GPC-SEC) as described in ASTM D5296 (2005).

In an embodiment, the terpene phenol resin is characterized by a polydispersity index (PDI) of from about 1.25 to about 1.45, alternatively from about 1.3 to about 1.4, or alternatively from about 1.32 to about 1.38. The PDI is given by equation 3:

$$PDI = Mw/Mn \quad (3)$$

Rubber Component:

The compositions further comprise rubber. The term "rubber" or "elastomer" include both natural rubber and its various raw and reclaim forms, as well as various synthetic rubbers.

In one embodiment, the rubber component comprises any of unsaturated diene elastomer selected from polybutadienes, natural rubber, synthetic polyisoprenes, butadiene copolymers, isoprene copolymers and the mixtures of such elastomer. In one embodiment, the rubber is selected from butyl rubber, halogenated butyl rubber, and EPDM (Ethylene Propylene Diene Monomer rubber), and mixtures thereof. In another embodiment, the rubber component is selected from natural rubber (NR), styrene-butadiene rubber (SBR), butadiene rubber (BR), synthetic polyisoprene rubber, epoxylated natural rubber, polybutadiene rubber, nitrile-hydrogenated butadiene rubber HNBR, hydrogenated SBR, ethylene propylene diene monomer rubber, ethylene propylene rubber, maleic acid-modified ethylene propylene rubber, butyl rubber, isobutylene-aromatic vinyl or diene monomer copolymers, brominated-NR, chlorinated-NR, brominated isobutylene p-methylstyrene copolymer, chloroprene rubber, epichlorohydrin homopolymers rubber, epichlorohydrin-ethylene oxide or allyl glycidyl ether copolymer rubbers, epichlorohydrin-ethylene oxide-allyl glycidyl ether terpolymer rubbers, chlorosulfonated polyethylene, chlorinated polyethylene, maleic acid-modified chlorinated polyethylene, methylvinyl silicone rubber, dimethyl silicone rubber, methylphenylvinyl silicone rubber, polysulfide rubber, vinylidene fluoride rubbers, tetrafluoroethylene-propylene rubbers, fluorinated silicone rubbers, fluorinated phosphagen rubbers, styrene elastomers, thermoplastic olefin elastomers, polyester elastomers, urethane elastomers, and polyamide elastomers. Exemplary natural rubber includes a latex collected by tapping Hevea brasiliensis, and a "deproteinized natural rubber latex" obtained by removing proteins from a natural rubber latex.

Examples of SBR rubber include an emulsion-polymerized styrene-butadiene rubber (un-modified E-SBR), a solution-polymerized styrene-butadiene rubber (un-modified S-SBR) and modified SBRs obtained by modifying terminals thereof (modified E-SBR and modified S-SBR) can be used. In one embodiment, the rubber component comprises rubber components other than the SBR and the BR such as a natural rubber (NR), an isoprene rubber (IR), an epoxidized natural rubber (ENR), a butyl rubber, an acrylonitrile butadiene rubber (NBR), an ethylene propylene diene rubber (EPDM), a chloroprene rubber (CR) a styrene-isoprene-butadiene rubber (SIBR), used alone or in combinations as needed.

The rubber component may be coupled, star-branched, branched, and/or functionalized with a coupling and/or star-branching or functionalization agent. The branched rubber can be any of branched ("star-branched") butyl rubber, halogenated star-branched butyl rubber, poly(isobutylene-co-p-methylstyrene), brominated butyl rubber, chlorinated butyl rubber, star-branched polyisobutylene rubber, and mixtures thereof.

In one embodiment, the rubber is end-group functionalized to improve its affinity for fillers, such as carbon black and/or silica. In one embodiment, the functionalized rubber made by living polymerization techniques is compounded with sulfur, accelerators, antidegradants, a filler, such as carbon black, silica or starch, and other suitable chemicals. Examples of coupling and/or star-branching or functionalizations include coupling with carbon black as a filler, e.g., with functional groups comprising a C—Sn bond or of aminated functional groups, such as benzophenone; coupling with a reinforcing filler, such as silica, e.g., silanol functional groups or polysiloxane functional groups having a silanol end; alkoxysilane groups, polyether groups.

In one embodiment, the rubber component is a highly unsaturated rubber, end-chain functionalized with a silanol group. In another embodiment, the rubber component is a functionalized diene rubber bearing at least on SiOR function, R being a hydrogen or a hydrocarbon radical. In yet another embodiment, the rubber component consists of SBR, or of SBR and BR for improved wet grip performance. In yet another embodiment, the rubber is epoxide-functionalized (or epoxidized), bearing epoxide functional groups. The epoxidized elastomer can be selected from the group consisting of epoxidized diene elastomers, epoxidized olefinic elastomers and mixtures thereof.

Fillers:

In one embodiment, the composition further includes fillers in an amount from 50 to 200 phr. The term "filler" refers to any material that is used to reinforce or modify physical properties, impart certain processing properties, or reduce cost of an elastomeric composition. Examples of fillers include, but are not limited to, calcium carbonate, carbon nanotube, clay, mica, silica, silicates, talc, titanium dioxide, alumina, zinc oxide, starch, wood flour, carbon black, or mixtures thereof. The fillers may be any size and typically range from 0.0001 μm-100 μm. In one embodiment, the fillers are surface-treated.

The term "silica" is meant to refer to any type or particle size silica or another silicic acid derivative, or silicic acid, processed by solution, pyrogenic, or the like methods, including untreated, precipitated silica, crystalline silica, colloidal silica, aluminum or calcium silicates, fumed silica, and the like. Precipitated silica can be conventional silica, semi-highly dispersible silica, or highly dispersible silica. Further examples include silicas having a BET surface area, as measured using nitrogen gas, from 40 to about 600. In one embodiment, the silica is characterized by having a dibutylphthalate (DBP) absorption value in a range of about 100 to about 400. In one embodiment, the silica has an average ultimate particle size, for example, in the range of 0.01 to 0.05 micron as determined by the electron microscope. In one embodiment, the amount of silica ranges from about 100 to about 180 phr of silica.

The composition may include from about 5 to about 50 phr of carbon black. The carbon black filler in one embodiment has an iodine absorptions ranging from 9 to 145 g/kg and DBP number ranging from 34 to 150 cm3/100 g.

Other fillers may be used include, but are not limited to, particulate fillers including ultra-high molecular weight polyethylene (UHMWPE), particulate polymer gels, and plasticized starch composite fillers known in the art.

In one embodiment, the fillers are surface-treated. In one example, the filler is a silica material coated or reacted with terpene derived silanes, e.g., an alkoxy terpene epoxy silane as disclosed in U.S. Pat. No. 4,738,892, the disclosure is included herein in its entirety by reference. In another embodiment, the filler is treated in the presence of a functional moiety, such as at least one of an organosilane, an organotitanate or an organozirconate. In one embodiment prior to being mixed into the rubber composition, the filler is first surface-treated with a coupling agent such as aminosilane, hexamethyldisilazane (HMDS), and vinyltriethoxysilane, as disclosed in U.S. Pat. No. 7,579,397, incorporated herein by reference.

Coupling Agents:

In one embodiment, the rubber composition further comprises coupling agents. The term "coupling agent" is meant to refer to any agent capable of facilitating stable chemical and/or physical interaction between two otherwise non-interacting species, e.g., between a filler such as silica and an elastomer. Coupling agents cause silica to have a reinforcing effect on the rubber. The coupling agents may be premixed, or pre-reacted, with the filler particles or added to the rubber mix during the rubber/silica processing, or mixing, stage. In one embodiment, the coupling agent and a filler such as silica are added separately to the rubber mix during the rubber/silica mixing, or processing stage, for the coupling agent then combines in situ with the filler.

In one embodiment, the coupling agent is a sulfur-based coupling agent, an organic peroxide-based coupling agent, an inorganic coupling agent, a polyamine coupling agent, a resin coupling agent, a sulfur compound-based coupling agent, oxime-nitrosamine-based coupling agent, and sulfur.

In another embodiment, the coupling agent is at least bifunctional. Non-limiting examples of bifunctional coupling agents include organosilanes or polyorganosiloxanes. Other examples of suitable coupling agents include silane polysulfides, referred to as "symmetrical" or "unsymmetrical" depending on their specific structure. The coupling agent can also be bifunctional POSs (polyorganosiloxanes, or hydroxysilane polysulphide. The coupling agent can also include other silane sulphides, for example, silanes having at least one thiol (—SH) functional group (referred to as mercaptosilanes) and/or at least one masked thiol functional group. The coupling agent can also include combinations of one or more coupling agents described herein. In one embodiment, the coupling agent is an alkoxysilane or polysulphurized alkoxysilane, e.g., polysulphurized alkoxysilane.

Vulcanization Agent.

The compositions may further comprise a vulcanization agent. A vulcanization agent suitable for use in the present disclosure is sulfur or a sulfur-donor compound which may be used in the presence of a kinetic modifier of the reaction such as vulcanization accelerators and antioxidants. Non-limiting examples of sulfur-donor compounds suitable for use in the present disclosure are 2-(4-morpholinyldithio)-benzothiazole, tetramethylthiuram disulfide, tetraethylthiuram disulfide, dipentamethylene thiuram hexasulfide, N,N'-caprolactam disulfide and the like.

Examples of the vulcanization accelerators suitable for use in the present disclosure include thiazole-based vulcanization accelerators such as 2-mercaptobenzothiazole, dibenzothiazyl disulfide, and N-cyclohexyl-2-benzothiazylsulfenamide; thiuram-based vulcanization accelerators such as tetramethylthiuram monosulfide and tetramethylthiuram disulfide; sulfenamide-based vulcanization accelerators such as N-cyclohexyl-2-benzothiazolesulfenamide, N-t-butyl-2-benzothiazolesulfenamide, N-oxyethylene-2-benzothiazolesulfenamide, N-oxyethylene-2-benzothiazolesulfenamide, and N,N'-diisopropyl-2-benzothiazolesulfenamide; and guanidine-based vulcanization accelerators such as diphenylguanidine, diorthotolylguanidine, and orthotolylbiguanidine. The compositions may further comprise antioxidants and antidegradants such as diphenyl-p-phenylenediamine, fatty acids such as stearic acid, and inorganic oxides such as zinc oxide.

Plasticizer Component:

"Plasticizer" (also referred to as a processing oil), refers to a petroleum derived processing oil and synthetic plasticizer to extend elastomers and improve the processability of the composition. Suitable plasticizers include, but are not limited to, aliphatic acid esters, hydrocarbon processing oils, tall oil pitch and modified tall oil pitch, and combinations thereof. The amount of plasticizer is present in an amount of 2 to 25 phr in one embodiment, and 5 to 15 phr in a second embodiment. In a third embodiment, the plasticizer is present in an amount of weight ratio of resin to plasticizer is greater than 1. In a second one embodiment, the weight ratio of resin to plasticizer is greater than 3. In a third embodiment, greater than 6.

In one embodiment, the plasticizer is a modified tall oil pitch selected from the group of a pitch ester, a decarboxylated tall oil pitch, a soap of tall oil pitch, a thermally treated tall oil pitch, and a thermally and catalytically treated tall oil pitch.

In one embodiment, the plasticizer include both extending oil present in the elastomers, and process oil added during compounding. Suitable process oils include aromatic, paraffinic, naphthenic, and low PCA oils, such as MES, TDAE, and heavy naphthenic oils, and vegetable oils such as sunflower, soybean, and safflower oils. Examples of low PCA oils include those having a polycyclic aromatic content of less than 3 percent by weight. Suitable vegetable oils include, for example, soybean oil, sunflower oil and canola oil which are in the form of esters containing a certain degree of unsaturation.

Cross-Linking Agents:

In one embodiment and depending on the rubber component used, the rubber component in the composition may be crosslinked by adding curative agents, for example sulfur, metals, metal oxides such as zinc oxide, peroxides, organometallic compounds, radical initiators, fatty acids, and other agents common in the art. Zinc oxide, typically at 5 phr, is added to form zinc halide that then acts as the catalyst for the vulcanization of the rubber compounds. Other known methods of curing that may be used include, peroxide cure systems, resin cure systems, and heat or radiation-induced crosslinking of polymers. Accelerators, activators, and retarders may also be used in the curing process.

Other Additives:

The composition can be compounded with other components known in the art, e.g., sulfur donors, curing aids, such as accelerators, activators and retarders and processing additives, pigments, fatty acid, zinc oxide, waxes, antioxidants and antiozonants and peptizing agents.

Methods for Forming: The rubber composition can be formed by methods known to those having skill in the rubber mixing art. For example, the components are typically mixed in two or two stages, for example, at least one non-productive stage followed by a productive mix stage. The final curatives, e.g., sulfur-vulcanizing agents are typically mixed in the final stage which is conventionally called the "productive" mix stage in which the mixing typically occurs at a temperature, or ultimate temperature, lower than the mix temperature(s) than the preceding non-productive mix stage(s).

The rubber composition may be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions, and the volume and nature of the components. For example, the thermomechanical working may be from 1 to 20 minutes.

INDUSTRIAL APPLICABILITY

Besides tire applications, the composition can be extruded, compression molded, blow molded, injection molded, and laminated into various shaped articles including fibers, films, laminates, layers, industrial parts such as automotive parts, appliance housings, consumer products, packaging, and the like.

In tire applications, the composition are useful in components for a variety of tires such as truck tires, bus tires, automobile tires, motorcycle tires, off-road tires, aircraft tires, and the like. The compositions may also be fabricated into a component of a tire, e.g., treads, sidewalls, chafer strips, tire gum layers, reinforcing cord coating materials, cushion layers, and the like.

The composition can also be useful in a variety of applications, particularly tire curing bladders, inner tubes, air sleeves, hoses, belts such as conveyor belts or automotive belts, solid tires, footwear components, rollers for graphic arts applications, vibration isolation devices, pharmaceutical devices, adhesives, caulks, sealants, glazing compounds, protective coatings, air cushions, pneumatic springs, air bellows, accumulator bags, and various bladders for fluid retention and curing processes. They are also useful as plasticizers in rubber formulations; as components to compositions that are manufactured into stretch-wrap films; as dispersants for lubricants; and in potting and electrical cable filling and cable housing materials.

The composition may also be useful in molded rubber parts such as automobile suspension bumpers, auto exhaust hangers, and body mounts. In yet other applications, compositions can also be useful in medical applications such as pharmaceutical stoppers and closures and coatings for medical devices.

In an embodiment, the tread rubber compositions (TRCs) are processed into vehicle tires or components thereof (e.g., surface tread components) according to suitable manufacturing techniques. Such components may be useful for passenger car tire treads, especially for low-rolling resistant tires. These components can be used also for other tire types such as winter tires, summer tires, all season tires high performance (HP) and ultra-high performance tires (UHP). The TRCs may also be utilized in the fabrication of tires for light trucks, trucks, buses, off-the road (OTR) tires, airplane tires and two wheelers such as motorbikes, scooters, bicycles.

In an embodiment, tire components fabricated the TRCs display a wet traction indicator (also known as wet grip) that is increased by about 9% and a rolling resistance indicator that is improved by about 10% to about 15%, alternatively about 6% when compared to an otherwise similar composition comprising a reference resin. Alternatively, tire components fabricated from a TRC display a wet traction indicator that is increased by about 9% and a rolling resistance indicator that is improved by about 6% when compared to an otherwise similar composition comprising a terpene phenol resin having a hydroxyl value greater than 10 mg/g KOH and a softening point temperature less than 155° C. Wet traction and rolling resistance indicators can be determined as described in the examples section utilizing dynamic mechanical analysis.

One method of characterizing viscoelastic polymeric materials is by measuring its complex modulus, $E^*=E'-E''$, where $E'$ and $E''$ are generally referred to as the storage modulus and loss modulus, respectively. The magnitude of the complex modulus, $|E^*|$, is defined as $[(E')^2+(E'')^2]_m$, and also represents the ratio of maximum stress to maximum strain ($\sigma^0/\varepsilon^0$). Measurement of the storage modulus and loss modulus allow comparisons of the materials ability to return energy to its ability to lose energy. The storage modulus $E'$ and loss modulus $E''$ may be measured by dynamic mechanical analysis (DMA).

The storage modulus $E'$ is associated with energy storage and release during periodic deformation. The loss modulus $E''$ is associated with the dissipation of energy and its transformation into heat. The ratio of these effects (E"/E') is tan δ, where δ is the phase angle between the applied force and the materials response to that force. The parameter tan δ is widely used as a measure of the damping capacity of viscoelastic materials. As stress is removed from elastomers and they return to their original shape, the movement is exothermic resulting in energy loss that dampens the rebound. Materials with a larger tan δ have a larger loss modulus and consequently dampen the rate of rebound.

In an embodiment, the TRCs have a tan δ at 0° C. ranging from about 0.62 to about 0.72, alternatively from about 0.65 to about 0.70, or alternatively from about 0.66 to about 0.68. Tan δ at 0° C. is an indicator of wet traction. In another embodiment, the TRCs have a tan δ at 60° C. ranging from about 0.14 to about 0.20, alternatively from about 0.15 to about 0.19, or alternatively from about 0.16 to about 0.18. Tan δ at 60° C. is an indicator of rolling resistance. In yet another embodiment, the TRCs have a high rebound characterized by a rebound at 23° C. ranging from about 24% to about 32%, alternatively from about 26% to about 30%, or alternatively from about 27% to about 29%. Rebound may be determined according to EN 1417+A1 on Zwick/Roell 5109.

In an embodiment, the TRCs have a high rebound characterized by a rebound at 60° C. ranging from about 40% to about 65%, alternatively from about 50% to about 60%, or alternatively from about 54% to about 58%.

In an embodiment, a composition of the type disclosed herein comprises a terpene phenol resin; a rubber compound; and one or more of the following: a filler, a coupling agent, an extender oil, a vulcanization agent, a vulcanization accelerator, and an antioxidant; all of the type disclosed herein. In such embodiments, the terpene phenol resin may be present in the composition in an amount in the range of from about 5 phr to about 70 phr, alternatively from about 8 phr to about 30 phr, or alternatively from about 10 phr to about 25 phr.

EXAMPLES

The following illustrative examples are intended to be non-limiting. In the examples, the testing methodologies used in the present disclosure are as follows:

Tsp: ASTM D 6090 Cup and Ball using DP70 of Mettler-Toledo.

Tg: ASTM D 6604 using DSC Q2000 of TA Instruments

Hydroxyl or OH number: ASTM E 222 using 848 Titrino Plus of Metrohm

Tan δ: Dynamic Mechanical Analysis (DMA) in temperature-sweep/mode in double shear mode from −60° C. to +100° C. with a heat rate of 1° C./min at 10 Hz and a dynamic strain of 0.1% (from −60° C. to −5° C.) and a dynamic strain of 3% (from −5° C. to 100° C.) using a Metravib +450N. Out of this measurement, the wet grip indicator commonly used is tan δ at 0° C. (tan δ 0° C.) and the rolling resistance indicator commonly used is tan δ at 60° C. (tan δ 60° C.)

Rubber hardness: ASTM D 2240-97 with Shore A hardness Tester of Wallace.

Rebound: EN 1417+A1 on Zwick/Roell 5109.

Exemplary Three Stage Mixing Protocol:

Stage I

| Step # | Action | Time (min) | Speed (rpm) |
|---|---|---|---|
| 1 | Add polymer | 0.5 | 60 |
| 2 | Masticate | 1 | 60 |

-continued

| Step # | Action | Time (min) | Speed (rpm) |
|---|---|---|---|
| 3 | Add 1$^{st}$ shot | 0.5 | 60 |
| 4 | Masticate | 1 | 60 |
| 5 | Add 2$^{nd}$ shot | 0.5 | 60 |
| 6 | Masticate | 1 | 60 |
| 7 | Add 3$^{rd}$ shot | 0.5 | 60 |
| 8 | Masticate | 0.5 | 60 |

Stage II

| Step # | Action | Time (min) | Speed (rpm) | Temp (° C.) |
|---|---|---|---|---|
| 1 | Add NP1 | 0.5 | 90 | 75 |
| 2 | To temp | | 120 | 145 |
| 3 | Salinize | 4 | Variable | 145-150 |

Stage III

| Step # | Action | Time (min) | Speed (rpm) | Temp (° C.) |
|---|---|---|---|---|
| 1 | Add remill | 0.5 | 55 | 75 |
| 2 | Masticate | 0.3 | 55 | |
| 3 | Add curatives | 0.3 | 55 | |
| 4 | To temp | | 55 | 100 |

Example 1—Table 1

In one embodiment, a tire tread composition of the type disclosed herein has a composition similar to compound 4 presented in Table 1. The composition disclosed herein may be formulated using any suitable methodology.

Example 2—Table 2

Another composition is presented in Table 2 which represents the first stage of a three stage mixing protocol shown above. The second stage is the remilling of the mixture resultant from the first stage and the final stage is the mixing of the resultant compound from the second stage with the remaining curatives.

TABLE 2

| | phr | Rubber gram | 1$^{st}$ shot filler gram | 2$^{nd}$ shot filler gram | 3$^{rd}$ shot gram |
|---|---|---|---|---|---|
| SSBR1 (BUNA ® 4526-2) | 48.1 | 59.7 | | | |
| BR (Buna ® CB24) | 30.0 | 37.2 | | | |
| SSBR (Sprintan ® SLR 4602) | 35.0 | 43.4 | | | |
| Silica Ultrasil ® 7000 GR (SA 165) | 80.0 | | 39.7 | 34.7 | 24.8 |
| Carbon Black - N234 | 5.0 | | | | 6.2 |
| Silane Si-69 ® | 8.0 | | | 9.9 | |
| Zinc Oxide RS ® | 3.0 | | | | 3.7 |
| Stearic acid | 2.0 | | 2.5 | | |
| Vulkanox ® 4010 (iPPD/antidegradant) | 1.0 | | | | 1.2 |
| Vulkanox ® 4020 (6PPD/antidegradant) | 2.0 | | | | 2.5 |
| Vulkanox ® HS (TMQ/antioxidant) | 0.5 | | | | 0.6 |
| Antilux ® 654 (wax) | 1.0 | | | | 1.2 |
| Resin | 20.00 | | 9.9 | 8.7 | 6.2 |

Referring to Table 2, the composition may be prepared by contacting the components in the order listed and mixing the materials using a suitable mixer. The mixing operation is typically a batch operation, with each batch producing more than 200 kilograms of rubber compound in less than three to five minutes. The mixer is a sophisticated piece of heavy equipment with a mixing chamber that has rotors inside (Banbury, Internal mixer). Its main function is to break down the rubber bale, fillers, and chemicals and mix them with other ingredients. The curative package is normally added in the final stage of mixing. Once the mixing is completed, the batch is dumped out of the mixer and sent through a series of machines to form it into a continuous sheet called a "slap." The slap is then transferred to other areas for bead wire assembly preparation, innerliner calendering, steel and/or fabric belt/ply cord calendering, tire sidewall extrusion, and tire tread extrusion. An exemplary mixing protocol is provided in the examples.

Figure 1:
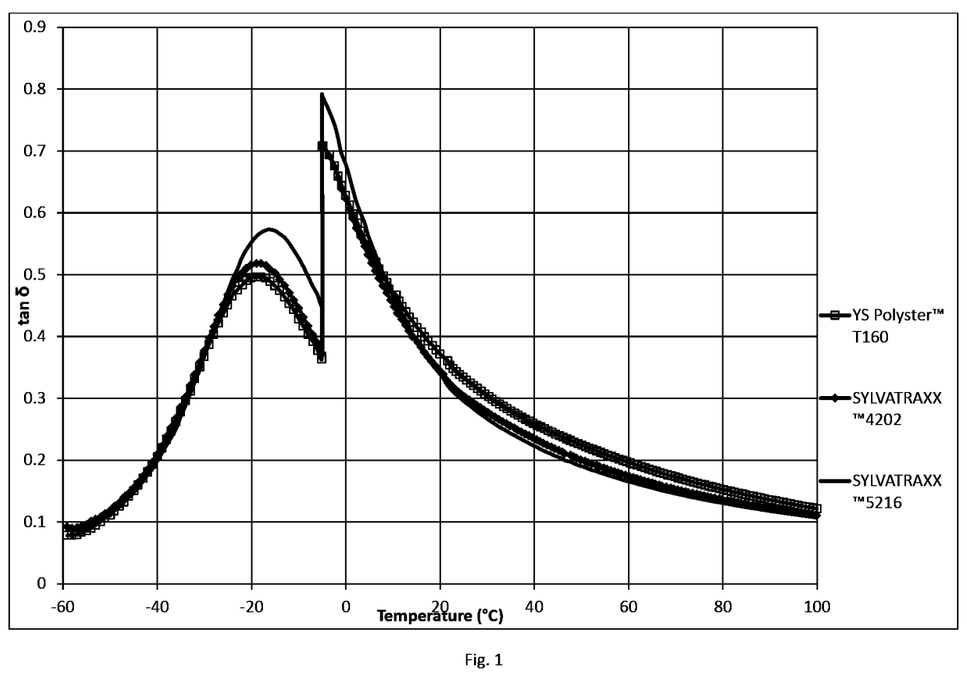
FIG. 1 is a graph of tan δ as a function of temperature for comparative rubber compositions and for rubber compositions including resin E prepared according to the present disclosure.
Figure 2:
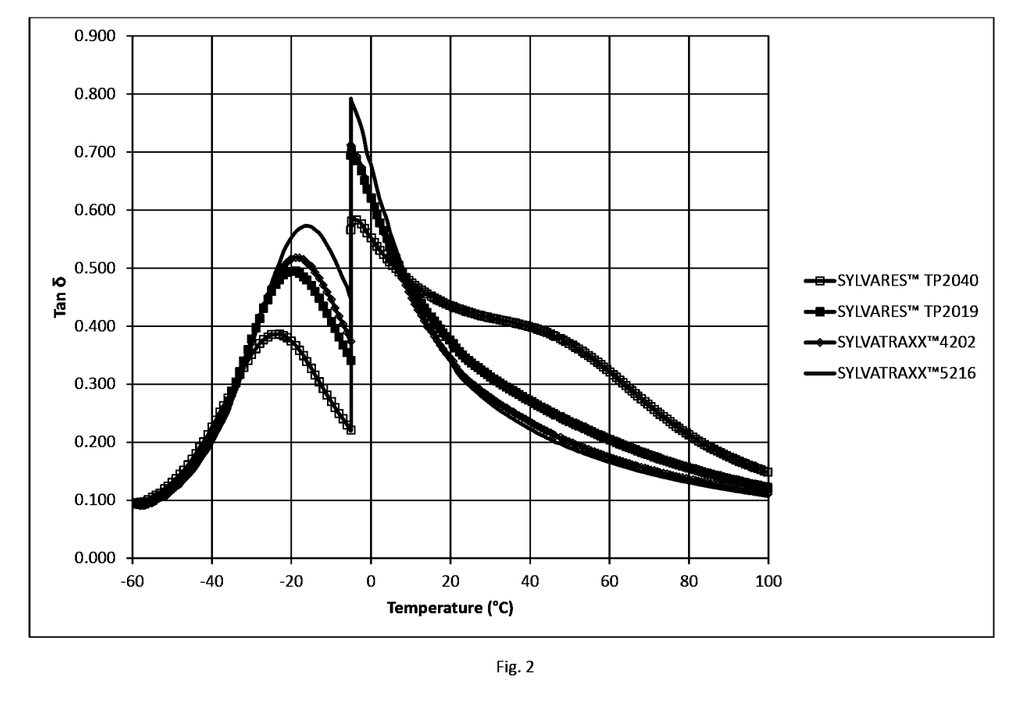
FIG. 2 is a graph of tan δ as a function of temperature for rubber compositions.

Table 3 provides for the resin properties of the different formulations as initially described in Table 2, while Table 4 presents a comparison of the physical properties of the inventive and comparative resins. FIGS. 1 and 2 display the normalized data for a plot of tan δ as a function of temperature.

TABLE 1

| Component | Manufacturer | | Cmpd. 1 | Cmpd. 2 | Cmpd. 3 | Cmpd. 4 | Cmpd. 5 |
|---|---|---|---|---|---|---|---|
| SSBR1 (BUNA ® 4526-2) | Lanxess | | 48.12 | 48.12 | 48.12 | 48.12 | 48.12 |
| BR (Buna ® CB24) | Lanxess | | 30 | 30 | 30 | 30 | 30 |
| SSBR (Sprintan ® SLR 4602) | Trinseo | | 35 | 35 | 35 | 35 | 35 |
| Silica Ultrasil ® 7000 GR (SA 165) | Evonik | | 80 | 80 | 80 | 80 | 80 |
| Carbon Black - N234 | | | 5 | 5 | 5 | 5 | 5 |
| Silane Si-69 ® | Evonik | | 8 | 8 | 8 | 8 | 8 |
| Zinc Oxide RS ® | Grillo | | 3 | 3 | 3 | 3 | 3 |
| Stearic acid | | | 2 | 2 | 2 | 2 | 2 |
| Vulkanox ® 4010 (iPPD/antidegradant) | Lanxess | | 1 | 1 | 1 | 1 | 1 |
| Vulkanox ® 4020 (6PPD/antidegradant) | Lanxess | | 2 | 2 | 2 | 2 | 2 |
| Vulkanox ® HS (TMQ/antioxidant) | Lanxess | | 0.5 | 0.5 | 0.5 | 0.5 | 0.5 |
| Antilux ® 654 (wax) | Rheinchemie | | 1 | 1 | 1 | 1 | 1 |
| SYLVATRAXX ™ 4202 | Arizona Chemical LLC | Comparative Example, Ref. | 20 | 0 | 0 | 0 | 0 |
| SYLVARES ™ TP 2019 | Arizona Chemical LLC | Comparative Example | 0 | 20 | 0 | 0 | 0 |
| SYLVARES ™ TP 2040 | Arizona Chemical LLC | Comparative Example | 0 | 0 | 20 | 0 | 0 |
| SYLVATRAXX ™ 5216 | Arizona Chemical LLC | Example 1 | 0 | 0 | 0 | 20 | 0 |
| YS Polyster ™ T160 | Yasuhara Chemical Co.., LTD | Comparative Example | 0 | 0 | 0 | 0 | 20 |
| Curatives: | | | | | | | |
| Rhenogran ® CBS-80 | Rheinchemie | | 1.9 | 1.9 | 1.9 | 1.9 | 1.9 |
| Rhenogran ® DPG-80 | Rheinchemie | | 2.5 | 2.5 | 2.5 | 2.5 | 2.5 |
| Rhenogran ® IS- 90-65 | Rheinchemie | | 2.3 | 2.3 | 2.3 | 2.3 | 2.3 |
| Total | | | 242.32 | 242.32 | 242.32 | 242.32 | 242.32 |

TABLE 3

| Resin Properties | | Reference | Resin C | Resin D | Resin E | Resin F |
|---|---|---|---|---|---|---|
| Resin Properties | Dim. | SYLVATRAXX ™ 4202 | SYLVARES ™ TP 2019 | SYLVARES ™ TP 2040 | SYLVATRAXX ™ 5216 | YS Polyster ™ T160 |
| SP | [° C.] | 115 | 125 | 118 | 150 | 160 |
| Tg | [° C.] | 62 | 78 | 71 | 95.2 | 105 |
| Mn | Da | 590 | 625 | 590 | 746 | 770 |
| Mw | Da | 800 | 869 | 740 | 1014 | 1090 |
| Polydispersity | | 1.35 | 1.4 | 1.3 | 1.35 | 1.4 |
| OH Number | mgKOH/g | 26 | 35 | 140 | 10 | 45 |

TABLE 4

| Compound Properties | Dim | Reference SYLVATRAXX ™ 4202 | Resin C SYLVARES ™ TP 2019 | Resin D SYLVARES ™ TP 2040 | Resin E SYLVATRAXX ™ 5216 | Resin F YS Polyster ™ T160 |
|---|---|---|---|---|---|---|
| Hardness | Shore A | 66 | 66 | 70 | 64 | 64 |
| tan δ @ 0° C. | | 0.623 | 0.621 | 0.552 | 0.677 | 0.628 |
| tan δ @ 60° C. | | 0.174 | 0.204 | 0.321 | 0.163 | 0.196 |
| Normalized tan δ @ 0° C. | % | 100 | 100 | 89 | 109 | 101 |
| Normalized tan δ @ 60° C. | % | 100 | 85 | 54 | 106 | 89 |

TABLE 4-continued

| Compound Properties | Dim | Reference SYLVATRAXX™ 4202 | Resin C SYLVARES™ TP 2019 | Resin D SYLVARES™ TP 2040 | Resin E SYLVATRAXX™ 5216 | Resin F YS Polyster™ T160 |
|---|---|---|---|---|---|---|
| Rebound @ 23° C. | | 29.41 | 28.24 | 24.55 | 28.75 | 25.76 |
| Rebound @ 60° C. | | 54.85 | 52.96 | 47.48 | 56.76 | 52.47 |
| Rebound @ 23° C. normalized | % | 100 | 104 | 120 | 102 | 114 |
| Rebound @ 60° C. normalized | % | 100 | 97 | 87 | 103 | 96 |

The invention claimed is:

1. A terpene phenol resin having a softening point temperature in the range of from about 100° C. to about 170° C., a hydroxyl value in the range from about 5 to about 18 mg KOH/g, a glass transition temperature of from 95° C. to 103° C.; and a number average molecular weight of from about 700 Da to about 790 Da, a weight average molecular weight of from about 930 Da to about 1090 Da, and a polydispersity index of from about 1.25 to about 1.45.

2. The terpene phenol resin of claim 1, wherein the resin comprises monomers selected from the group consisting of piperylenes, cyclic pentadienes, aromatics, limonenes, pinenes, amylenes, and combinations thereof.

3. The terpene phenol resin of claim 1, wherein the terpene phenol resin is obtained by polymerizing phenol and at least a terpene selected from the group consisting of α-pinene, β-pinene, dipentene, and limonene, at a molar ratio of terpene to phenol in the range from about 1:1 to about 4:1.

4. The terpene phenol resin of claim 1, wherein the terpene phenol resin is obtained by adding a phenol to at least a terpene selected from the group consisting of α-pinene, β-pinene, dipentene, and limonene, in the presence of a Lewis acid catalyst, at a molar ratio of terpene to phenol in the range from about 1:1 to about 4:1, and wherein the Lewis acid catalysts is selected from ether complexes of boron trifluoride and organic acid complexes of boron trifluoride.

5. The terpene phenol resin of claim 1, wherein the terpene phenol resin is obtained by polymerizing phenol and at least a terpene selected from the group consisting of α-pinene, β-pinene, dipentene, and limonene, at a molar ratio of terpene to phenol in the range from 95:5 to 60:40.

6. The terpene phenol resin of claim 1, wherein the terpene phenol resin is obtained by adding a phenol to at least a terpene selected from the group consisting of α-pinene, β-pinene, dipentene, and limonene, in the presence of a Lewis acid catalyst, at a molar ratio of terpene to phenol in the range from 95:5 to 60:40,
wherein the Lewis acid catalyst is selected from ether complexes of boron trifluoride and organic acid complexes of boron trifluoride.

7. A composition comprising a blend of:
a rubber component and based on 100 parts by weight (phr) of the rubber component;
from about 50 to 200 phr of a filler;
from about 0 to 25 phr of a plasticizer; and
from about 5 phr to about 70 phr of the terpene phenol resin of claim 1.

8. The composition of claim 7, wherein the composition is for use as a tire tread formulation, and wherein the tire tread formulation has a tan δ at 0° C. of from 0.62 to 0.72, and a tan δ at 60° C. of from 0.14 to 0.20, measured using dynamic mechanical analysis in temperature-sweep/mode in double shear mode, with a heat rate of 1° C./min at 10 Hz, and a dynamic strain of 0.1% from −60° C. to −5° C., and a dynamic strain of 3% from −5° C. to 100° C.

9. The composition of claim 7, wherein the tire tread formulation further comprises a coupling agent selected from the group of: a sulfur-based coupling agent, an organic peroxide-based coupling agent, an inorganic coupling agent, a polyamine coupling agent, a resin coupling agent, a sulfur compound-based coupling agent, oxime-nitrosamine-based coupling agent, and sulfur.

10. The composition of claim 7, wherein the rubber component is selected from the group of natural rubber (NR), styrene-butadiene rubber (SBR), butadiene rubber (BR), synthetic polyisoprene rubber, epoxylated natural rubber, polybutadiene rubber, nitrile-hydrogenated butadiene rubber NHBR, hydrogenated styrene-butadiene rubber HSBR, ethylene propylene diene monomer rubber, ethylene propylene rubber, maleic acid-modified ethylene propylene rubber, butyl rubber, isobutylene-aromatic vinyl or diene monomer copolymers, brominated-NR, chlorinated-NR, brominated isobutylene p-methyl styrene copolymer, chloroprene rubber, epichlorohydrin homopolymers rubber, epichlorohydrin-ethylene oxide or allyl glycidyl ether copolymer rubbers, epichlorohydrin-ethylene oxide-allyl glycidyl ether terpolymer rubbers, chlorosulfonated polyethylene, chlorinated polyethylene, maleic acid-modified chlorinated polyethylene, methylvinyl silicone rubber, dimethyl silicone rubber, methylphenylvinyl silicone rubber, polysulfide rubber, vinylidene fluoride rubbers, tetrafluoroethylene-propylene rubbers, fluorinated silicone rubbers, fluorinated phosphagen rubbers, styrene elastomers, thermoplastic olefin elastomers, polyester elastomers, urethane elastomers, and polyamide elastomers.

11. The composition of claim 7, wherein the rubber is coupled, star-branched, or functionalized with at least a sulfur compound, a silanol group, a silane group, an epoxy group.

12. The composition of claim 7, wherein the plasticizer is selected from aliphatic acid esters, hydrocarbon processing oils, tall oil pitch and modified tall oil pitch, and combinations thereof.

13. The composition of claim 7, wherein the filler is selected from calcium carbonate, clay, mica, silica, silicates, talc, titanium dioxide, alumina, zinc oxide, starch, wood flour, carbon black, ultra-high molecular weight polyethylene (UHMWPE), particulate polymer gels, plasticized starch composites, and mixtures thereof.

14. The composition of claim 7, wherein the filler is surface treated prior to being added to the composition.

15. The composition of claim 7, wherein the composition is extruded, compression molded, blow molded, injection molded, or laminated into a molded rubber part.

16. The composition of claim 7, wherein the composition is extruded, compression molded, blow molded, injection molded, or laminated into any of fibers, films, laminates, layers, automotive parts, appliance housings, consumer products, and packaging products.

\* \* \* \* \*